US006554019B1

(12) United States Patent
Grittmann

(10) Patent No.: US 6,554,019 B1
(45) Date of Patent: Apr. 29, 2003

(54) AERATION VALVE

(76) Inventor: Guenter Grittmann, Ringstrasse 6, D-75031 Eppingen-Muehlbach (DE)

( * ) Notice: Subject to any disclaimer, the term of this patent is extended or adjusted under 35 U.S.C. 154(b) by 0 days.

(21) Appl. No.: 09/698,153

(22) Filed: Oct. 30, 2000

(30) Foreign Application Priority Data

Oct. 29, 1999 (DE) ........................................ 199 52 473

(51) Int. Cl.[7] ......................... F16K 24/06; B65D 47/32; B65D 47/36

(52) U.S. Cl. ...................... 137/318; 222/83; 222/541.2; 222/541.6

(58) Field of Search ................................ 137/318, 589; 222/83, 541.2, 541.5, 541.6, 5; 220/203.05, 203.06, 203.09, 288, 303

(56) References Cited

U.S. PATENT DOCUMENTS 4,730,636 A * 3/1988 Volgstadt et al. ........... 137/318
5,105,844 A * 4/1992 King, Sr. .................... 137/318
5,694,972 A * 12/1997 King .......................... 137/318

* cited by examiner

*Primary Examiner*—George L. Walton
(74) *Attorney, Agent, or Firm*—Foley & Lardner

(57) ABSTRACT

An aeration valve for drink cans with a valve insert radially movable in an elastic bung sleeve is provided. The sleeve includes a holding mechanism and sealings. A radially movable valve insert includes a gripping part formed substantially as plate with an axial projection formed centrally thereon and a holder in which the projection engages. The projection has at least one surface which forms a channel with the inner wall of a soft part of the sleeve. The holder has at least one sealing surface which, together with the inner wall of the sleeve formed by the soft part, seals off the lateral bore against liquid, and at least one surface which forms a channel with the inner wall of the soft part of the sleeve. The plate of the gripping part has recesses which, with the surface of the outer flange, form a channel running parallel thereto. The plate of the gripping part may include a cam formed on the lower side which engages in a recess in the outer flange. A bottom plate is formed on a hard part of the sleeve and may have predetermined breaking points to facilitate insertion of a tapping pipe.

14 Claims, 5 Drawing Sheets

AERATION VALVE

BACKGROUND OF THE INVENTION

The present invention relates to an aeration valve for drink cans. In particular, the present invention relates to aeration valves advantageously used for approximately five liter cans containing a liquid such as, for example, beer.

Conventional five liter drink cans, which can have a laterally positioned emptying tap, are known to include aeration valves that are insertable in an upper bunghole. The aeration valves typically include a valve insert formed as one piece and an elastic bung socket also made in one piece with a sealing bead cooperating with the valve insert, a projection serving for the support on the edge region of the can lid surrounding the can opening, a sealing surface present below the projection and cooperating with the edge of the can opening, as well as a support gripping behind the edge of the can opening.

The bung socket has a lateral aeration opening on the section directed into the inner part of the can. The valve insert is rotatably mounted and can be moved between an "open" and a "closed" position, whereby the aeration opening is opened or closed.

One disadvantage of known aeration valves is that the bung socket is completely made of elastic material and, therefore, it is difficult to provide a valve that may be operated to selectively seal a drink can under pressure.

A further problem associated with the introduction of the known aeration valves into the bung hole of the cans results from the projection being formed from a soft material. The soft material can give way when the valve is forced into position so that the entire valve is pressed into the can.

In the case of the known aeration valves, a lip formed on the valve insert engages two recesses formed in the projections of elastic material which are provided for the determination of whether the valve is in the "open" or closed" position. In addition, a projection arranged in the interior of the bung socket, together with the edges of a recess in the valve insert, serves as a mechanical stop for the determination of the "open" or "closed" position.

A disadvantage of this valve structure is that, during the rotational movement of the opening procedure, the lip on the valve insert projects into the material of the projection and deforms the projection, thus making the opening procedure more difficult. The performance of the stop is limited by the elastic material of the projection in the interior of the sleeve. As a result, turning of the valve insert too far cannot be prevented.

It is not possible to determine the exact starting and end points of rotary movement of the valve insert. Thus, an exact opening and closing of the valve cannot take place. Due to the structure of the mechanical stop, the valve insert has a complex geometric form which leads to high production costs. In addition, the complex form only permits the valve insert to rotate in one direction.

Furthermore, as disclosed in German Patent No. DE 3345619, bung hole closures are known which serve for receiving dispensing fittings with tapping pipes and can also be used for the aeration of drink cans because an integrally formed plate is penetrated.

One disadvantage associated with the use of a lateral emptying cock or of a dispensing fitting without a tapping pipe, is that the penetration and thus the aeration of the drink can cannot take place without the use of an auxiliary means or a firm object such as, for example, a key or screw driver.

It is a further disadvantage that, in the case of drink cans which are equipped with known aeration valves and a lateral emptying cock, it is not possible to use a dispensing fitting with a tapping pipe.

The present invention provides an aeration valve having optimal sealing, and relatively simple and exact aeration of drink cans, while also making possible the use of a dispensing fitting having a tapping pipe.

SUMMARY OF THE INVENTION

According to the present invention an aeration valve for a can is provided. The aeration valve includes a sleeve configured to be inserted into a top opening of the can, the sleeve including an inner wall surrounding an axial bore, a top surface facing generally away from the can when the sleeve is inserted, and a lateral bore positioned on a lower portion of the sleeve adapted to be inserted into the can. The valve further includes a rotatable insert positioned within the axial bore, the insert including a plate, a projection formed centrally on the plate, and a holder in which the projection engages. The projection includes a first flat surface in a spaced apart relationship with the inner wall to form a first channel therebetween. The holder includes a first sealing surface adapted to mate with the inner wall of the sleeve to thereby seal the lateral bore and a second flat surface in a spaced apart relationship with the inner wall to form a second channel fluidly connected to said first channel. The plate extends over the top surface of the sleeve and includes a bottom surface overlying the top wall and including a first recess fluidly connected to the first channel and an exterior of the valve, so that when the insert is rotated to position the second flat surface opposite the lateral bore, the interior of the can is aerated through the second channel, the first channel and the first recess.

Preferably, the bottom surface of the plate includes a cam which engages a second recess located in the top surface of the sleeve. The sleeve preferably includes a bottom plate closing the end of the axial bore that is configured to be inserted into the can, where the bottom plate has a predetermined breaking point. The bottom plate may alternately include a stopper capable of being held by clamping action. The holder preferably includes a cutting edge directed toward the bottom plate of the sleeve and engages the predetermined breaking point in the sleeve.

The holder preferably further includes a radial guide member located on a lower side. Preferably, the radial guide member has a diameter corresponding substantially to the diameter of the axial bore of the sleeve and includes a recess on a lower side of the holder that engages an upwardly projecting extension of the bottom plate. The holder preferably includes a second sealing surface and a third flat surface.

The projection preferably includes radial guide members which cooperate with a sealing bead located on the inner wall of the sleeve. The plate preferably includes a tab that is, preferably, connected to the plate via hinges. The top surface of the sleeve preferably includes a cut-away edge having a downward sloping opening that engages the tab.

BRIEF DESCRIPTION OF THE DRAWINGS

These and other features, as aspects, and advantages of the present invention will become apparent from the following description, appended claims, and the accompanying exemplary embodiments shown in the drawings, which are briefly described below.

DETAILED DESCRIPTION OF PREFERRED EMBODIMENT

Figure 1:
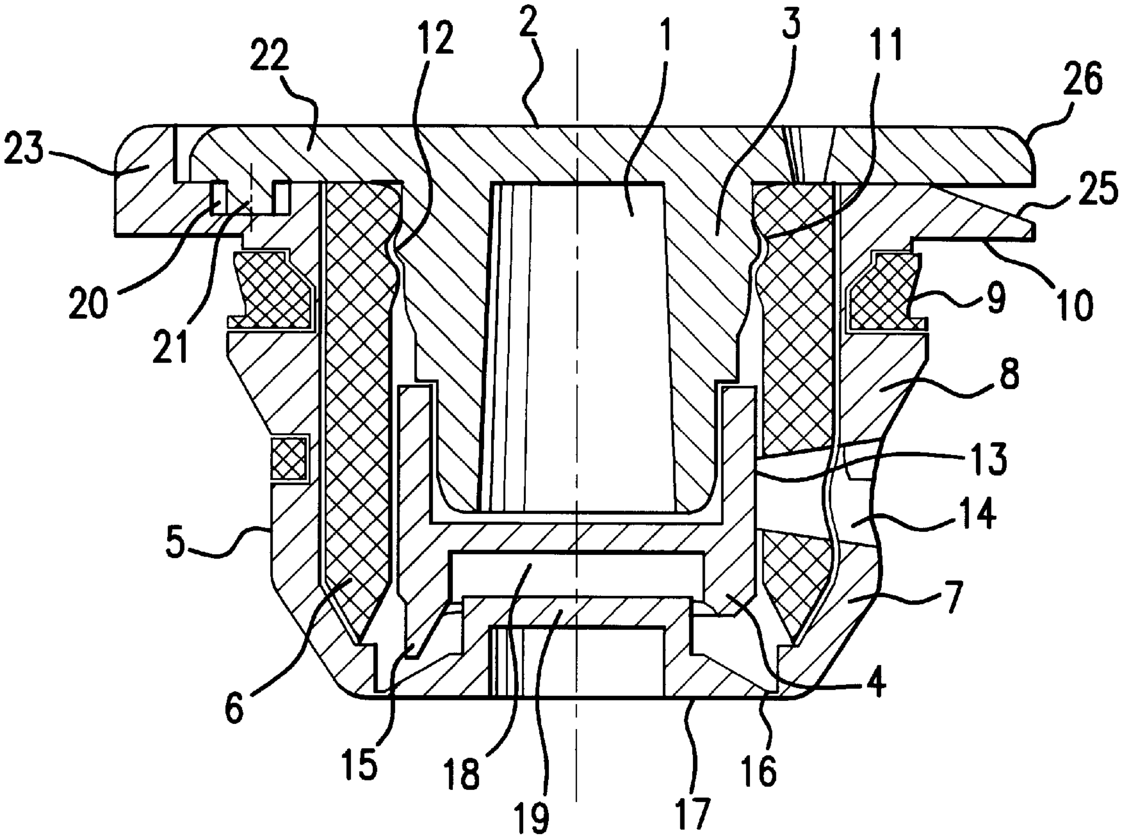
FIG. 1 is a sectional view of an assembled aeration valve.

An aeration valve for drink cans is provided. The valve includes a valve insert radially movable in an elastic bung socket, whereby the bung socket is constructed from an inner sealing soft part and a hard part in the form of a sleeve, whereby the hard part has a catch mechanism consisting of inner holding wedges, an outer flange, as well as a sealing ring lying therebetween, whereby the edge of the sleeve lying opposite the outer flange is closed by a plate formed thereon and the sleeve has an axial bore with at least one sealing bead of the soft part cooperating with the valve insert and whereby the bung socket, on the lower section which extends into the can interior, has a lateral bore passing through the hard and soft part. According to the invention, the radially movable valve insert includes a holding part made substantially as a plate with a projection formed centrally thereon and a holder in which the projection engages, whereby the projection has at least one surface which, with the inner wall of the soft part of the sleeve, forms a canal. The holder has at least one sealing surface which, together with the inner wall of the sleeve formed by the soft part, seals off the lateral bore against the liquid and at least one surface which forms a canal with the inner wall of the soft part of the sleeve. The plate of the holding part has recesses which, with the surface of the outer flange, forms a canal running parallel thereto. Furthermore, on the plate of the holding part, a cam is formed on the lower side which engages in a recess in the outer flange. The plate formed on the hard part has predetermined breaking points.

The valve insert consists of a holding part with projection and a holder on which the projection engages. The valve insert as a whole is introduced into the interior of the sleeve. The holder has at least one sealing surface which, in the interior of the sleeve, seals off the lateral bore in the sleeve in the "closed" position of the valve for liquid, as well as at least one surface which, with the inner wall of the sleeve, forms a canal through which can take place a pressure equalization with the outer atmosphere in the "open" position of the valve. The projection of the holding part is formed on a plate which, with the outer flange of the bung socket, closes off substantially flush. On the lower side of the plate is formed a cam which engages in a recess in the outer flange of the bung sleeve. This recess is advantageously made substantially semicircular. The ends of the recess form a stop for the cam and thus a limitation of the rotary movement of the valve insert.

Furthermore, according to the invention, the plate has, on the lower side, recesses which, with the surface of the outer flange, form a canal running parallel thereto which is connected with the canal formed by the inner wall of the sleeve and the flattenings of the projection, as well as of the holder, and thus, in the case of operation of the valve, makes possible the desired pressure equalization between the can interior and the atmosphere.

In the case that the device is not to serve for the aeration of the drink can, but rather for the reception of a dispensing fitting with tapping pipe, the holding part with projections is pulled out of the bung sleeve. In this case, the holder remains in the interior of the sleeve and, in the case of the piercing of the plate with the tapping pipe, is pushed into the interior of the can. The plate formed on the lower side of the sleeve directed toward the interior of the can has predetermined breaking points which make possible an easy penetration of the plate. Alternatively, instead of the formed-on plate, the sleeve is closed by a stopper held by clamping action, whereby a dispensing fitting with tapping pipe can be introduced especially easily.

Preferably, the holder has, on the lower side, a cutting edge which tears the predetermined breaking point of the formed-on plate in the case of the insertion of the tapping pipe and thus makes easier the penetration of the plate.

On the lower side, the holder can have a radial guide member, whereby, on the one hand, the introduction of the valve insert into the sleeve is simplified, a better guiding in the case of the rotary movement of the valve is achieved and, on the other hand, the holder can be held exactly positioned in order to ensure an optional sealing.

The guide member can be made as a disc formed on the lower side of the holder with a diameter which corresponds substantially to the diameter of the axial bore sleeve.

However, the guide member is preferably made as a recess in the lower region of the holder in which engages an extension of the plate formed on the hard part.

The projection of the holding part can also have guide members which cooperate with the sealing bead of the sleeve and bring about a further improvement of the behavior of the valve insert.

On the plate of the holding part is advantageously arranged a bendable bracket which can be bent up for the smoother operation of the valve. The bracket preferably engages into an opening in the edge of the outer flange of the sleeve. Preferably, this opening also has a slope in the direction of the can lid so that the bracket can better grip.

FIG. 1 discloses a section through a complete aeration valve according to the invention. Therein, the rotatable valve insert 1, consisting of the gripping part 2 with projection 3 and the holder 4, is introduced into the sleeve 5, consisting of the soft part 6 and the hard part 7. The hard part has a holding wedge 8, a sealing ring 9, as well as an outer flange 10. The soft part 6 forms the inner wall of the sleeve 5 with the sealing bead 11. The guide member 12 of the projection 3 engages into the sealing bead 11 and thus makes possible an exact rotary movement of the valve insert 1. The holder 4 has at least one sealing surface 13 which, in the closed state of the valve, tightly closes the lateral bore 14 to the liquid.

The recess 18 serves as guide member for the holder 4 and thereby cooperates with a projection 19 of the plate 17 so that the holder 4 is held exactly positioned and thus a secure sealing is achieved.

The outer flange 10 has a recess 20 which engages a cam 21 which is formed on the lower side of the plate 22 of the gripping part 2.

Figure 4:
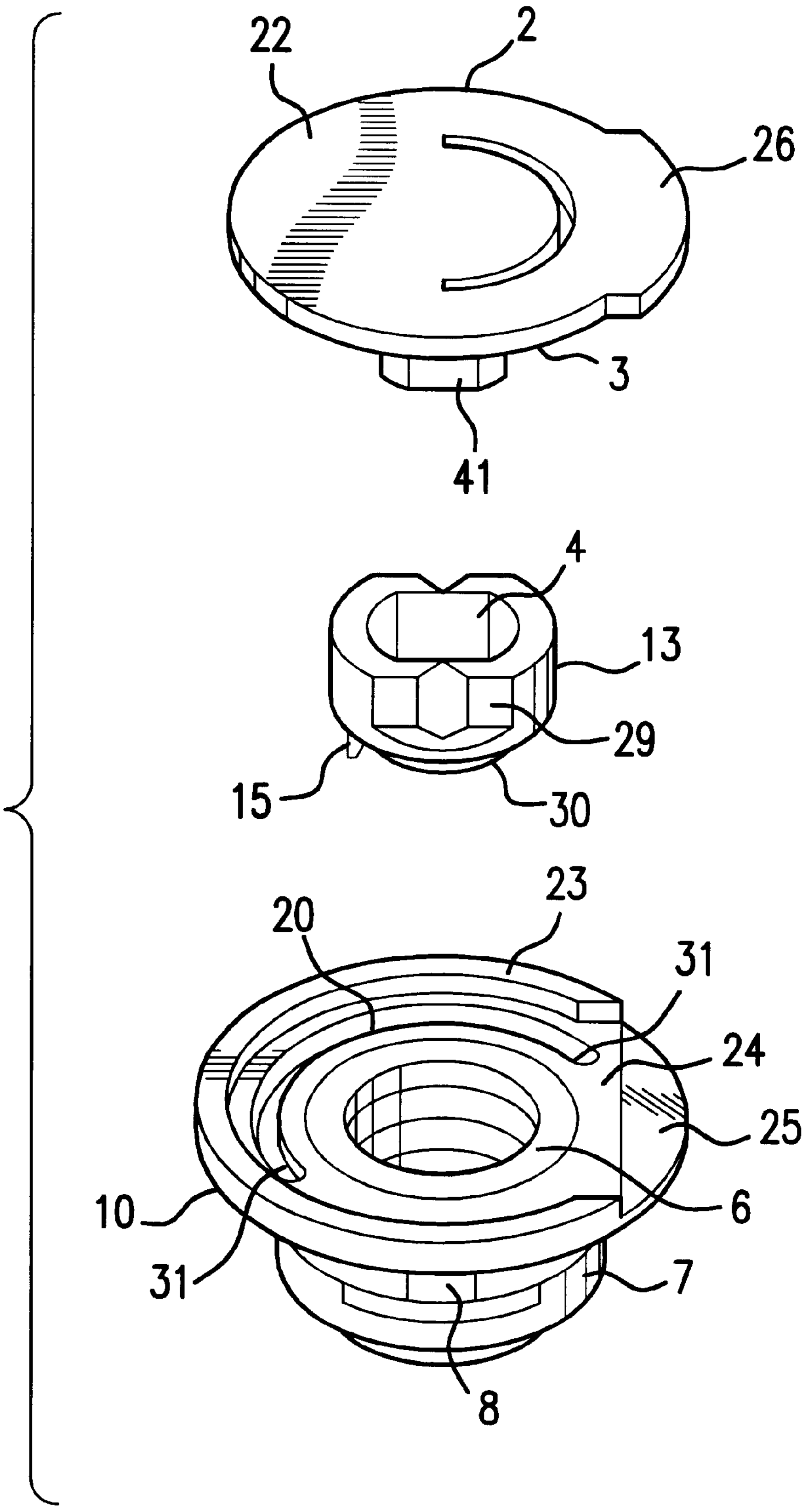
FIG. 4 is a perspective view of the exploded representation of the valve.

The plate 22 of the gripping part 2 terminates substantially flush with the edge 23 of the outer flange 10. The edge 23 preferably has a cut-away portion 24 which is provided with a slope 25 which simplifies gripping of the tab 26 which is bendable upwardly (FIG. 4).

Figure 3:
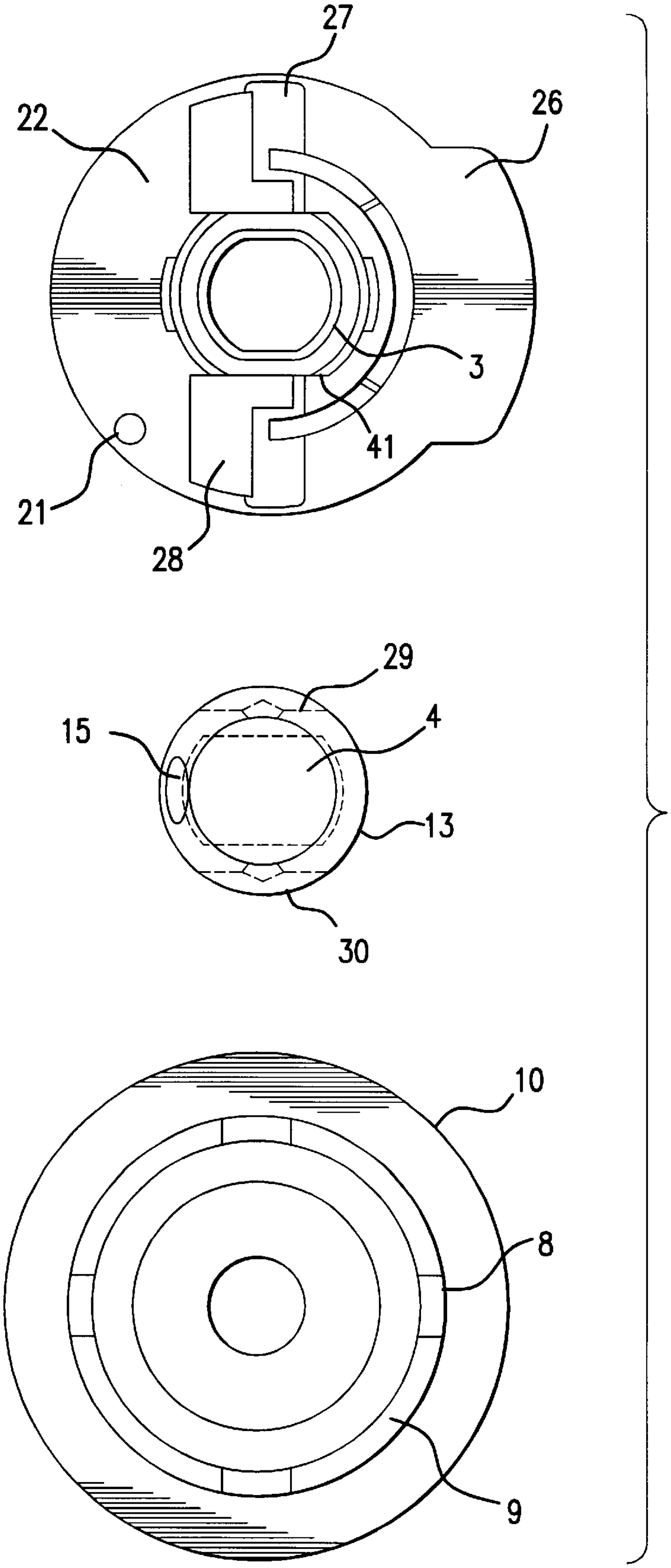
FIG. 3 is an exploded representation taken from below each exploded element of the valve.

In the "closed" position of the valve, the sealing surface 13 of the holder 4 lies in front of the lateral bore 14 and seals this off against the liquid in the can interior. For the aeration, the valve insert 1 is turned so that the flattened areas 29 of the holder 4 and of the projection 3 are present in front of the lateral bore 14. In this way, a second channel is formed between the flattened areas 29 of the holder 4 and the inner wall of the sleeve 5, which is in connection with a first channel formed between the flattened areas 41 of the projection 3 and the inner wall of the sleeve 5 which in turn fluidly connects with recesses 28 in the plate 22 of the gripping part 2 (FIG. 3). The recesses 28 create an opening between the gripping part 2 and the surface of the outer flange 10 and, thus, aeration of the can interior is made possible.

Figure 5:
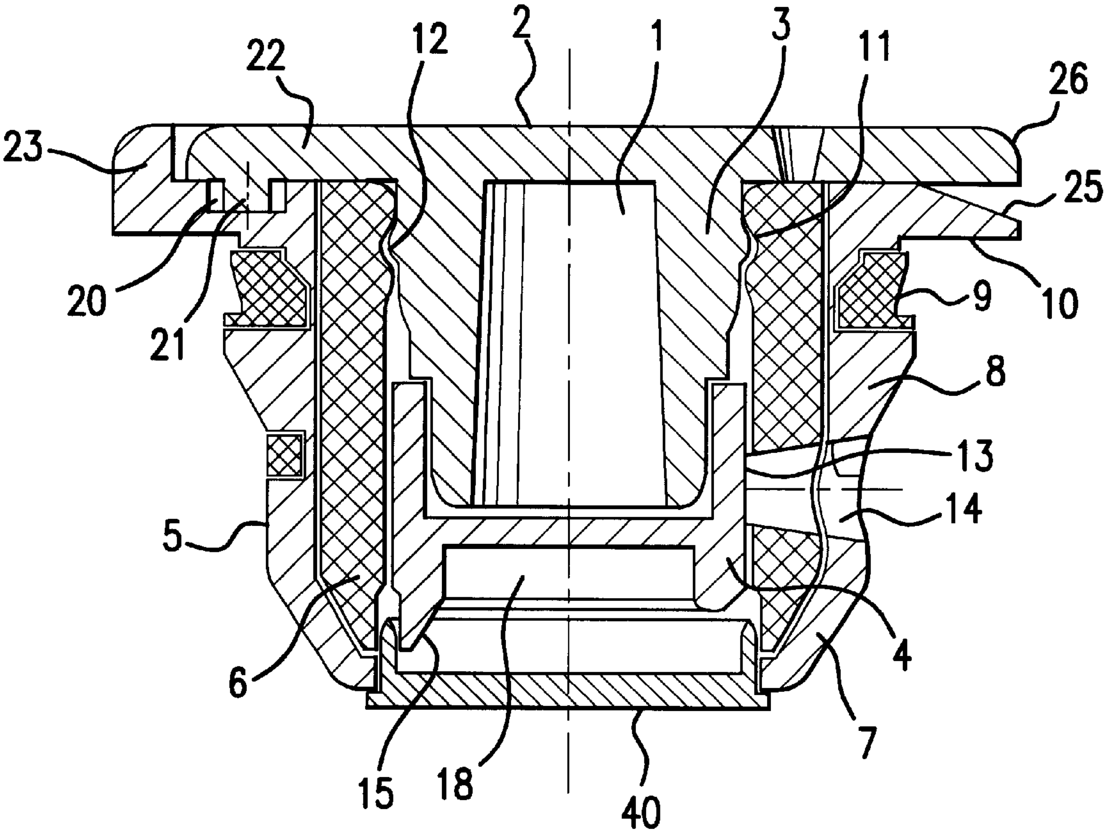
FIG. 5 is a sectional view of an alternative embodiment of an assembled aeration valve.

For the case that a dispensing fitting with a tapping pipe is to be used for the tapping of the drink can, the gripping part 2 with the projection 3 is taken out of the sleeve 5. The holder 4 remains in the sleeve, whereby the integrally formed plate 17 (or a clamped stopper) and the holder 4 are pushed into the can interior. The sealing bead 11 thereby serves for the sealing off of the tapping pipe. FIG. 5 discloses the clamped stopper 40.

As shown in FIG. 1, on the lower side of the holder 4 is advantageously arranged a cutting edge 15 which engages into the predetermined breaking point 16 of the plate 17 formed as part of the hard part 7. In the case of inserting a dispensing device having a tapping pipe, the cutting edge 15 tears the predetermined breaking point and thus simplifies pressing through plate 17. Alternatively, as shown in FIG. 5, the clamped stopper 40 may be forced out by the holder 4.

Figure 2:
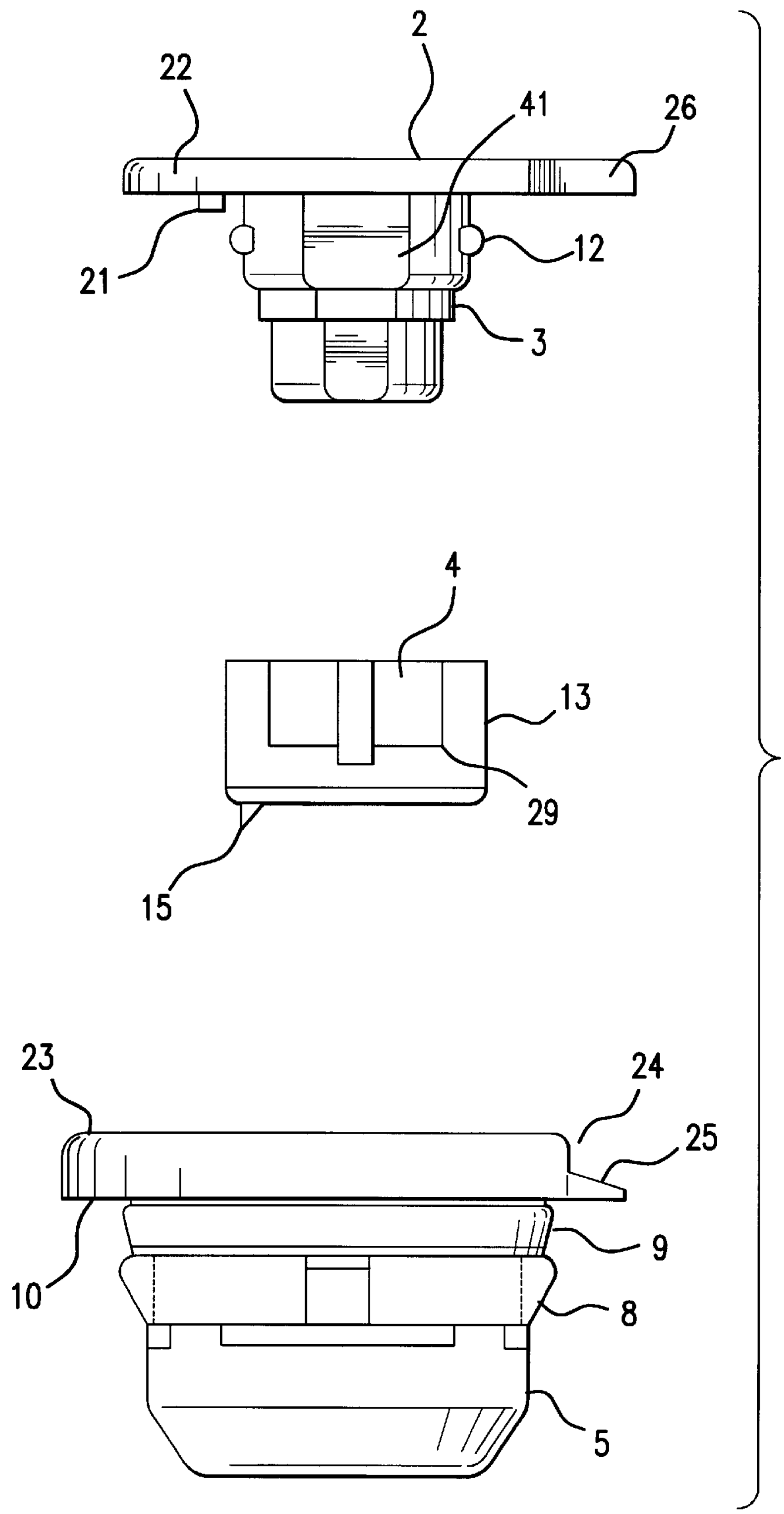
FIG. 2 is an exploded representation of the side view of a valve.

FIG. 2 shows an exploded side view of the individual parts of an aeration valve according to the invention. The projection 3 of the gripping part 2 is pushed into the holder 4. The complete valve insert 1 is then inserted into the sleeve 5. The projection 3 and the holder 4 have, in each case are chambered on the lower side to simplify insertion. The holding wedges 8 are embedded in the soft material of the sealing ring 9.

FIG. 3 shows a bottom view of the individual parts of an aeration valve. The bottom view of the gripping part 2 shows the tab 26 which is preferably connected with the plate 22 via hinges 27, which are preferably made by thinning of the material. On the lower side of the plate 22 are provided recesses 28 which, parallel to the surface of the flange 10, form channels that are connected with the channel which is formed by the flattened areas 41 of the projection 3 and of the holder 4 with the inner wall of the sleeve 5 and thus, in the "open" position of the valve, make possible the pressure equalization between can interior and atmosphere.

FIG. 4 shows perspective illustrations of the individual parts of an aeration valve according to the invention. FIG. 4 shows the gripping part with the tab 26 and the plate 22, as well as the projection 3 with the flattened portions 41. FIG. 4 also shows the holder 4 with two sealing surfaces 13 and flattened portions 29. On the lower side of the holder is arranged a guide member 30 which corresponds substantially to the diameter of the axial bore of the sleeve 5. There is thereby ensured a precise positioning of the sealing surface 13 of the holder 4 in the sleeve 5. A positional displacement of the holder 4 during the rotary movement of the valve insert 1 is thereby prevented. On the lower side of the guide member 30 is advantageously arranged a cutting edge 15. FIG. 4 shows perspective illustrations of the sleeve 5. The edge 23 of the outer flange 10 is provided with a cut-away portion 24 which preferably has a sloped region 25. In the "closed" position of the valve, the tab 26 engages in the cut-away portion 24. The slope 25 simplifies the engagement of the tab 26. The ends of the recess 20 in the outer flange 10 form the stops 31 for the cams 21. In a preferred embodiment of the invention, the holder 4 has two sealing surfaces 13, as well as two flattened portions 29. In this case, the recess 20 is advantageously substantially semi-circular shaped so that the valve insert 1 can be turned not only clockwise but also counterclockwise, and an aeration is made possible in two positions the lower side of the holder is arranged a guide member 30 which corresponds substantially to the diameter of the axial bore of the sleeve 5. There is thereby ensured a precise positioning of the sealing surface 13 of the holder 4 in the sleeve 5. A positional displacement of the holder 4 during the rotary movement of the valve insert 1 is thereby prevented. On the lower side of the guide member 30 is advantageously arranged a cutting edge 15. FIG. 4 shows perspective illustrations of the sleeve 5. The edge 23 of the outer flange 10 is provided with a cut-away portion 24 which preferably has a sloped region 25. In the "closed" position of the valve, the tab 26 engages in the cut-away portion 24. The slope 25 simplifies the engagement of the tab 26. The ends of the recess 20 in the outer flange 10 form the stops 31 for the cams 21. In a preferred embodiment of the invention, the holder 4 has two sealing surfaces 13, as well as two flattened portions 29. In this case, the recess 20 is advantageously substantially semi-circular shaped so that the valve insert 1 can be turned not only clockwise but also counterclockwise, and an aeration is made possible in two positions.

The priority application German Patent Application No. 199 52 473.4, filed Oct. 29, 1999, is incorporated herein by reference.

What is claimed is:

1. An aeration valve for a can comprising:

a sleeve configured to be inserted into a top opening of the can, the sleeve including an inner wall surrounding an axial bore, a top surface facing generally away from the can when the sleeve is inserted, and a lateral bore positioned on a lower portion of the sleeve adapted to be inserted into the can;

a rotatable insert positioned within the axial bore, the insert including a plate and a projection formed centrally on the plate; and a holder in which the projection engages;

wherein the projection includes a first flat surface in a spaced apart relationship with the inner wall to form a first channel therebetween;

wherein the holder includes a first sealing surface adapted to mate with the inner wall of the sleeve to thereby seal the lateral bore and a second flat surface in a spaced apart relationship with the inner wall to form a second channel fluidly connected to said first channel;

wherein the plate extends over a top surface of the sleeve and includes a bottom surface overlying the top surface of the sleeve and includes a first recess fluidly connected to the first channel and an exterior of the valve, so that when the insert is rotated to position the first and second flat surfaces opposite the lateral bore, the interior of the can is aerated through the second channel, the first channel and the first recess.

2. The valve of claim 1, wherein the bottom surface of the plate includes a cam which engages a second recess located in the top surface of the sleeve.

3. The valve of claim 1, wherein the sleeve includes a bottom plate closing the end of the axial bore that is configured to be inserted into the can, said bottom plate having a predetermined breaking point.

4. The aeration valve of claim 3, wherein the holder includes a cutting edge directed toward the bottom plate of the sleeve to engage the predetermined breaking point in the sleeve.

5. The aeration valve of claim 3, wherein the bottom plate comprises a stopper held by clamping action.

6. The aeration valve of claim 1, wherein the holder has a radial guide member located on its lower side.

7. The aeration valve of claim 6, wherein the radial guide member has a diameter corresponding substantially to the diameter of the axial bore of the sleeve.

8. The aeration valve of claim 6, wherein the radial guide member includes a recess on a lower side of the holder that engages an upwardly projecting extension of the bottom plate.

9. The aeration valve of claim 1, wherein the projection includes radial guide members which cooperate with a sealing bead located on the inner wall of the sleeve.

10. The aeration valve of claim 1, wherein the plate includes a gripping tab.

11. The aeration valve of claim 10, wherein the gripping tab is connected to the plate via a hinged mechanism.

12. The aeration valve of claim 10, wherein the top surface of the sleeve includes a cut-away portion for engaging the tab.

13. The aeration valve of claim 10, wherein the cut-away portion slopes downwardly.

14. The aeration valve of claim 1, wherein the holder comprises a second sealing surface and a third flat surface.

* * * * *